United States Patent
Pyron

(10) Patent No.: US 7,002,077 B2
(45) Date of Patent: Feb. 21, 2006

(54) THREADLESS CONDUIT FITTING INCLUDING CONTINUOUS COMPRESSION RING

(75) Inventor: Roger Pyron, Bartlett, TN (US)

(73) Assignee: Thomas & Betts International, Inc., Wilmington, DE (US)

( * ) Notice: Subject to any disclaimer, the term of this patent is extended or adjusted under 35 U.S.C. 154(b) by 0 days.

(21) Appl. No.: 10/790,480

(22) Filed: Mar. 1, 2004

(65) Prior Publication Data

US 2005/0189134 A1    Sep. 1, 2005

(51) Int. Cl.
*H02G 3/18* (2006.01)
(52) U.S. Cl. ................ 174/65 SS; 174/65 R; 174/135; 439/583; 285/341
(58) Field of Classification Search ........... 174/65 SS, 174/65 G, 65 R, 135; 439/583, 584; 285/341; 248/56
See application file for complete search history.

(56) References Cited

U.S. PATENT DOCUMENTS

| | | | |
|---|---|---|---|
| 3,393,267 A * | 7/1968 | Busse .................... | 174/78 |
| 3,794,362 A | 2/1974 | Mooney et al. | |
| 3,915,479 A | 10/1975 | Sotolongo | |
| 4,019,762 A | 4/1977 | Eidelberg et al. | |
| 4,022,966 A * | 5/1977 | Gajajiva ................. | 174/65 SS |
| 4,169,967 A * | 10/1979 | Bachle ................... | 174/65 SS |
| 4,493,522 A * | 1/1985 | Law ........................ | 439/271 |
| 4,549,755 A * | 10/1985 | Kot et al. ............... | 285/341 |
| 2002/0050718 A1 | 5/2002 | Pyron | |

OTHER PUBLICATIONS

Thomas & Betts brochure "The New T&B High/Low-Temperature Liquidtight System", no date.
T&B Conduit Fittings General Information, no date.
Bridgeport Fittings Quality Conduit & Cable Fittings website www.bptfittings.com/catalog., no date.

* cited by examiner

*Primary Examiner*—Dhiru R. Patel
(74) *Attorney, Agent, or Firm*—Hoffman & Baron, LLP

(57) ABSTRACT

A connector fitting for a threadless conduit and a method of securing such a fitting are provided. The connector fitting includes a connector body, a gland nut, and a continuous metal compression ring. The compression ring includes an annular stop and a pair of end portions. Upon tightening the gland nut, one end portion of the compression ring is urged between the connector body and conduit while the other end of the compression ring is press fit between the gland nut and conduit to form a rain tight seal. One or more indicators are provided for indicating that the gland nut has been properly torqued.

24 Claims, 3 Drawing Sheets

THREADLESS CONDUIT FITTING INCLUDING CONTINUOUS COMPRESSION RING

BACKGROUND OF THE INVENTION

1. Field of the Invention

The field of the invention relates to threadless conduit fittings and methods for securing such fittings to a conduit such as electrical metallic tubing, intermediate metallic conduit, or other rigid metal electrical conduit.

2. Brief Description of the Related Art

Connector fittings for electrical conduits may be of the type that employ a compression ring used to engage the outer surface of such a conduit. A threaded connector body is coupled to a gland nut, and the compression ring is positioned within the gland nut. When the gland nut is tightened, the compression ring is subjected to forces that cause it to bear tightly against the conduit. Fittings for rigid metal conduits of various diameters and wall thicknesses have been known to include split metal compression rings. Such rings can leave a gap at the area of the split. Various solutions have been proposed to address this problem, such as a resilient boot or the application of a sealant. In addition to increasing material and labor cost, the use of non-metallic components to enhance the seal with the conduit can reduce the service life of the connector fitting. U.S. Pat. Nos. 3,794,362 and 4,019,762 disclose various connector fittings that are intended to provide rain tight connections to rigid electrical conduits.

SUMMARY OF THE INVENTION

A connector fitting and a method of securing such a fitting to a conduit are provided. A connector fitting in accordance with the invention includes a connector body having a passage for receiving a conduit, a gland nut threadably coupled to the connector body, and a continuous metal compression ring within the gland nut. The gland nut includes a passage extending therethrough and a shoulder in the passage. The compression ring includes a stop, preferably in the form of a raised annular central portion. A first end portion of the compression ring is adjacent to the gland nut shoulder. Once the gland nut is tightened, the end portion is positioned between the gland nut and conduit to provide a rain tight seal.

The compression ring in accordance with a preferred embodiment of the invention is comprised of a central portion in the form of an annular ridge and end portions having substantially flat, rim-like configurations. The end portions include substantially flat, annular surfaces, one of which is press fit around the conduit as the connector fitting is tightened, the other of which is urged between the connector body and conduit to help retain the fitting on the conduit.

A connector fitting that provides visual indication of proper torquing is further provided by the invention. Such a fitting includes a connector body, a gland nut threadably coupled to the connector body, and a continuous metal compression ring within the gland nut. At least one means for visually indicating that the gland nut has been properly torqued is provided. Such means may include an end portion of the compression ring that is caused to protrude from the gland nut once properly torqued. An additional or alternative such means may include a stop on the connector body positioned to engage an end surface of the gland nut. When the end surface engages the stop, the user knows that the gland nut has been properly torqued and that the compression ring is providing a rain tight seal against a conduit to which the fitting is mounted.

A connector fitting that provides a tactile indication of proper torquing of the gland nut is also provided by the invention. The fitting includes a connector body, a gland nut threadably coupled to the connector body, a continuous metal compression ring, and means for providing a tactile indication that the gland nut has been properly torqued. Such means may preferably include a stop, preferably in the form of an annular ridge, formed on the compression ring that substantially prevents compression of the ring beyond a predetermined amount, thereby preventing further tightening of the gland nut. The person applying torque to the gland nut can accordingly tactilely sense that the compression ring is incapable of further compression. The gland nut and ridge are designed such that the point where a tactile stop is felt corresponds to the amount of torque specified for effecting a rain tight seal between the compression ring and conduit.

A method is provided for securing a connector fitting to a rigid conduit. The connector fitting includes a connector body, a gland nut threadably coupled to the connector body, and a continuous metal connector ring positioned within the gland nut. The connector fitting is mounted to the conduit and the gland nut is rotated with respect to the connector fitting. An end portion of the compression ring is thereby positioned between the gland nut and conduit, providing a press fit seal that ensures a rain tight connection.

DETAILED DESCRIPTION OF THE DRAWINGS

A connector fitting for a rigid conduit and a method for mounting such a fitting are provided. While preferred embodiments of the invention are disclosed herein, it is to be understood that the invention is not limited to the preferred embodiments and is to be interpreted by the appended claims.

Figure 1:
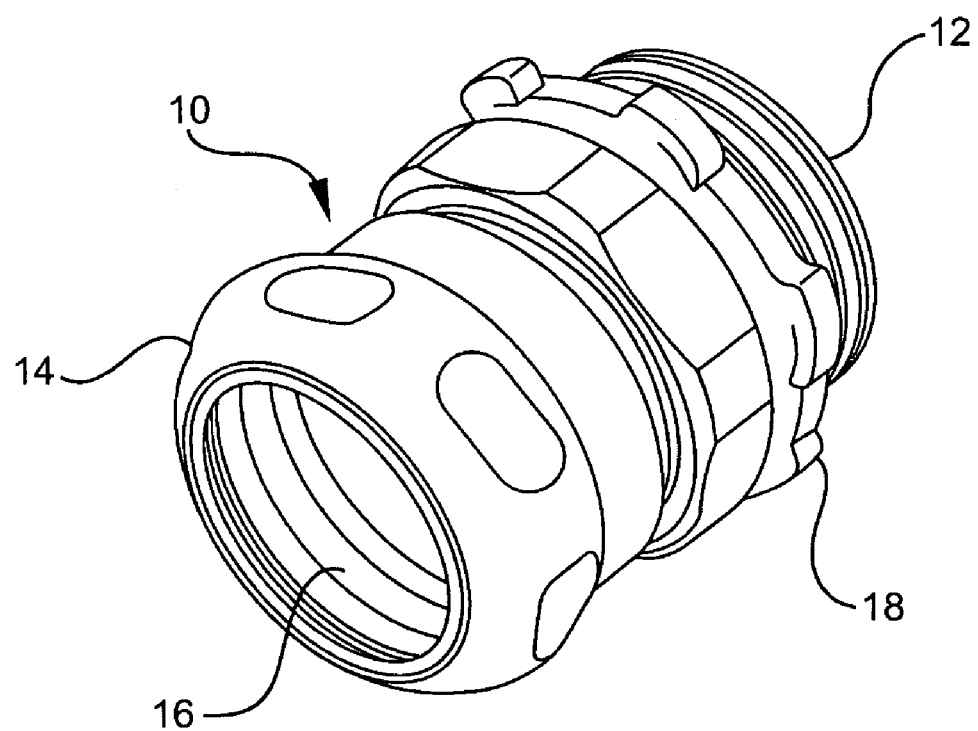
FIG. 1 is a perspective view of a connector fitting according to a preferred embodiment of the invention.

Referring to FIG. 1, a connector fitting 10 intended for coupling to a rigid conduit is shown as assembled. The connector fitting includes a connector body 12, a gland nut 14 threadably coupled to the connector body 12, and a compression ring 16. A locknut 18 is threadably coupled to the connector body on the end portion thereof opposite to the gland nut 14. These elements are shown individually in FIG. 2 and in cross section in FIG. 3. All of these elements are preferably made from moisture-resistant materials, particularly where the fitting is intended for outdoor use. If made from metal and used in conjunction with rigid metal conduit such as Electrical Metallic Tubing (EMT), Intermediate Metallic Conduit (IMC) or Galvanized Rigid Conduit (GRC), a fitting made in accordance with the invention will allow a rain tight seal while securing the conduit from pullout and maintaining electrical continuity. The types of materials employed in the manufacture of the connector fitting will depend on the type of conduit on which it is used and the expected environmental conditions. As used herein, the term "rigid" is not to be considered as restricted to relatively heavy conduit such as GRC, but rather as any substantially inflexible conduit. Such conduit may indeed be bendable through the use of appropriate bending equipment.

Figure 2:
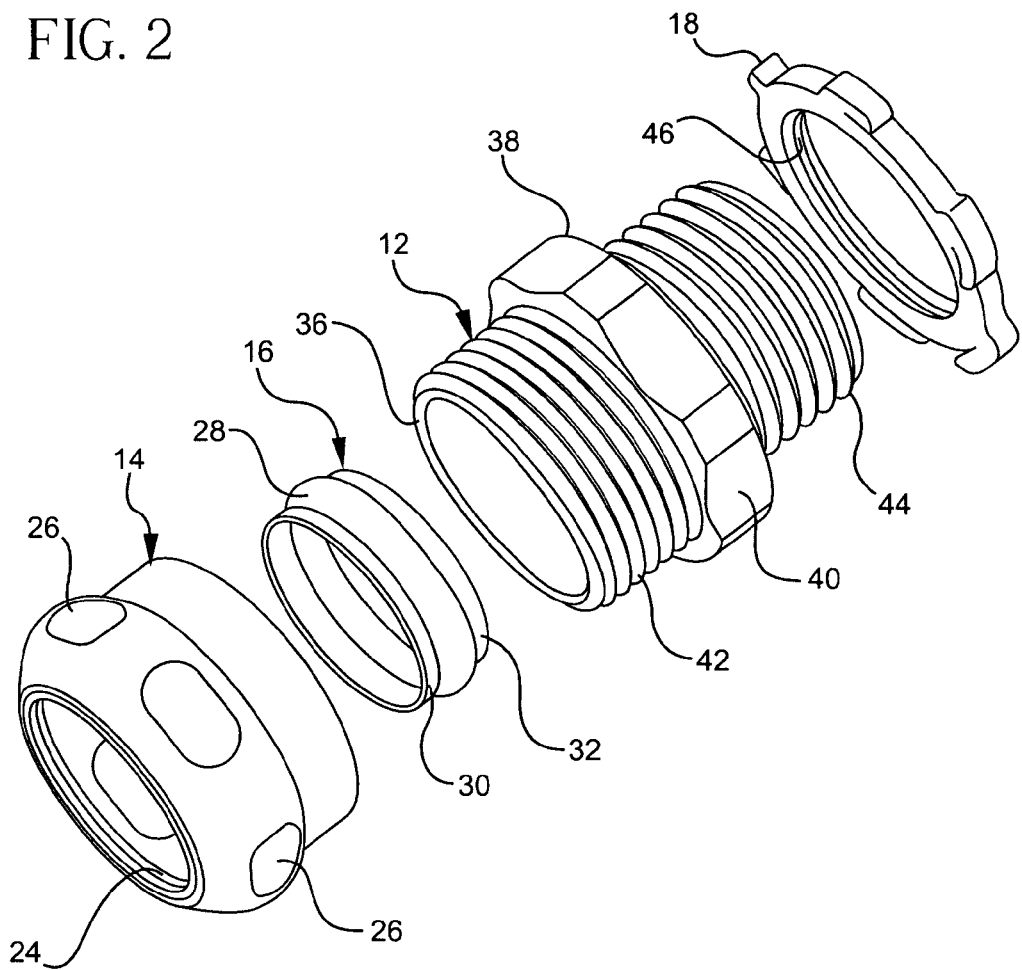
FIG. 2 is an exploded, perspective view thereof.
Figure 3:
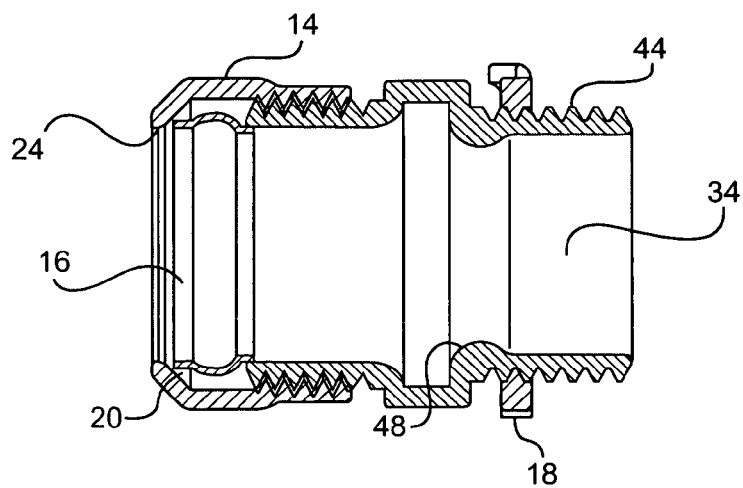
FIG. 3 is a sectional view thereof.

As best shown in FIGS. 2 and 3, the gland nut 14 includes an axial passage 20 having threads 22. The passage need not be entirely threaded. An annular shoulder 24 extends into the passage 20 at one of the passage's two openings. The shoulder defines a chamfer that faces inwardly. The exterior surface of the gland nut includes a plurality of diametrically opposing flat surfaces 26 to facilitate turning by a wrench.

The compression ring 16 in accordance with the preferred embodiment of the invention is continuous as opposed to split. There are accordingly no gaps therein. It is made to slip over a conduit and become a press fit member upon tightening of the connector fitting 10. The ring can be made in any of a variety of diameters in order to fit different size conduits and is otherwise dimensioned to interact with the gland nut and connector body with which it is used. It is made from a material that would be compatible with the conduit material as well as the material(s) used in the manufacture of the other elements of the connector fitting. Zinc-plated steel may be used to manufacture the compression ring as well as the gland nut, connector body and locknut. Such material is suitable for use for fittings employed with Electrical Metallic Tubing (EMT) as well as metal conduit having different wall thickness ranges such as IMC and GRC.

The compression ring 16 includes a central portion 28 and first and second coaxial end portions 30, 32. The central portion defines an annular stop. The stop is in the form of a hollow, annular ridge of uniform diameter in the preferred embodiment. Such a stop configuration is not required for successful operation of the compression ring. The dimensions of the stop correspond to the dimensions of the gland nut and connector body. As discussed hereafter, the stop is preferably sized to function as a positive stop, preventing tightening of the gland nut beyond a certain point. The point preferably corresponds to where the amount of torque specified for the fitting has been applied by the user. It also preferably corresponds to the point where the gland nut 14 bottoms out against the connector body, as discussed below. The end portions 30, 32 of the compression ring have substantially flat, rim-like configurations. The first end portion 30 has dimensions that allow it to be forced between an inner surface of the gland nut and an outer surface of the conduit to which the fitting is mounted, thereby providing a rain tight seal. The second end portion 32 is designed for insertion between an inner surface of the connector body 12 and the outer surface of the conduit. Once so inserted, a sufficient retention force is provided to prevent the fitting 10 from being uncoupled from the conduit. Resistance to pullout is also provided by the interaction of the first end portion of the compression ring 16 with the gland nut 14 and conduit.

While the preferred compression ring is symmetrical to allow installation in either direction, such symmetry is not required. Non-symmetrical geometrics may be employed if required to properly interact with the internal structures of the gland nut and connector body.

The connector body 12 includes a cylindrical passage 34 for receiving a conduit. The end of the connector body intended to be received in the gland nut 14 includes a chamfer 36 adjoining an opening to the passage. An enlarged portion 38 of the connector body includes flats 40 for facilitating application of a wrench. Two threaded sections 42, 44 extend from the enlarged portion. One of the sections is designed for threaded coupling to the gland nut. The other threaded section 44 receives the threaded opening 46 in the locknut.

The connector fitting 10 is intended to be provided to the user in the assembled form shown in FIGS. 1 and 3. It can alternatively be provided as individual components, leaving assembly to the user. Starting with the fitting 10 as assembled, the user slides the fitting over a rigid conduit 50 with the gland nut as the leading end. The end of the conduit abuts against an internal shoulder 48 in the connector body 12 when the fitting is properly mounted. The user then rotates the gland nut 14 with respect to the connector body 12, causing it to travel towards the enlarged portion 38 of the connector body. As the gland nut is tightened, the second end portion 32 of the compression ring is urged between the connector body and conduit. The chamfer 36 at the end of the connector body facilitates this process, guiding this end portion between these elements. As rotation of the gland nut continues, the stop 28 extending from the compression ring 16 adjoins the chamfered end of the connector body and prevents further movement of the compression ring in this direction. Subsequent gland nut rotation causes the first end portion 30 of the compression ring to be forced between the shoulder 24 and the conduit 50 such that the first end portion is press fit therebetween, providing a rain tight seal. In the preferred embodiment of the invention, the first end portion of the compression ring has sufficient length that it emerges partially beyond the gland nut and becomes visible to the installer.

The elements of the connector fitting 10 are designed to provide two different visual indicators that the gland nut has been properly torqued as well as a tactile indicator. They are also designed so that the fitting is securely retained on the conduit and a rain tight seal is provided. The ability to indicate proper torquing is desirable in that the installer may not have the tools required to know when the gland nut has been torqued in accordance with applicable code requirements. The connector fitting 10 is designed to ensure such requirements can be met should the user fail to employ a torque wrench in installing the fitting. It will be appreciated that fewer torque indicators than the three provided in the preferred connector fitting can be successfully employed.

Figure 4:
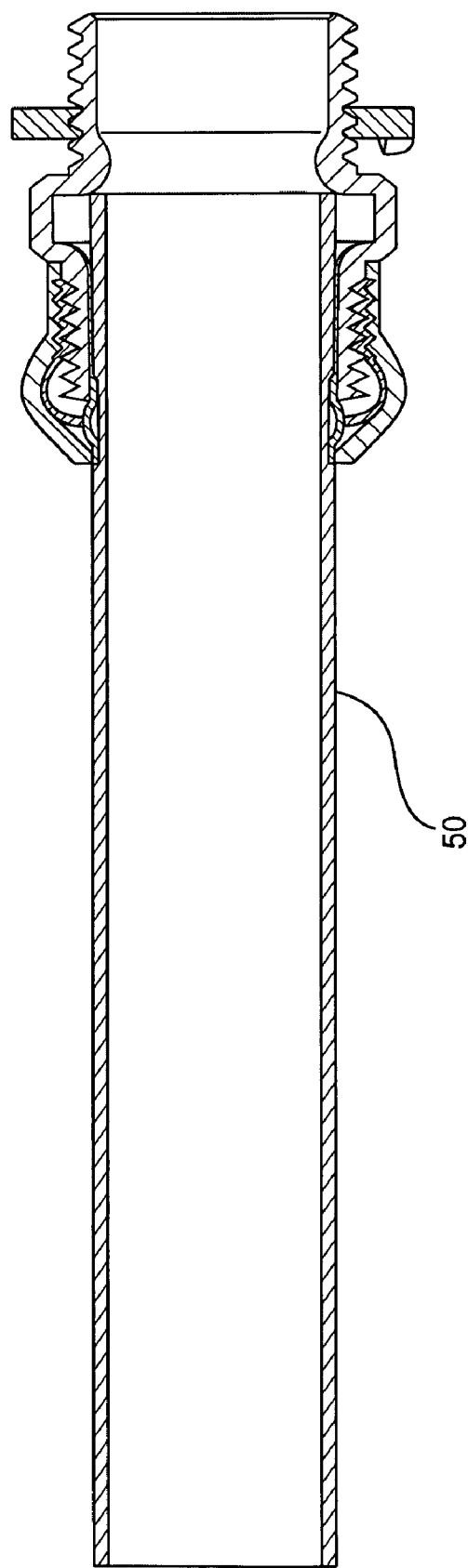
FIG. 4 is a sectional view of the connector fitting mounted to a conduit and after tightening of the gland nut.

One visual torque indicator includes the first end portion 30 of the compression ring. The dimensions of the compression ring, gland nut and connector body are preferably such that the first end portion of the compression ring extends partially outside the gland nut opening when the gland nut has been torqued to specifications. As shown in FIG. 4, this part of the compression ring becomes visible to the user. Tightening of the gland nut is complete at this point.

A second visual indicator is provided by the engagement of the enlarged portion 38 of the connector body 12 with an end surface of the gland nut 14, as shown in FIG. 4. This engagement is visible to the installer and is also tactilely sensed. In this preferred embodiment, the gland nut engages the enlarged portion 38 of the connector body at substantially the same time the first end portion 30 of the compression ring emerges from the gland nut opening. The enlarged portion of the connector body accordingly functions as a stop that can be seen as well as felt.

A tactile indicator is provided by the interaction of the stop 28 on the compression ring with the shoulder 24 of the gland nut and chamfered end of the connector body 12. Once the gland nut has been tightened to the extent shown in FIG. 4, the installer can tactilely sense the positive stop caused by the engagement of the stop 28 with these elements. Such engagement occurs at the same time the torque applied to the gland nut 14 is within specifications.

In summary, a connector fitting is provided with a continuous compression ring that provides superior performance in forming a rain tight seal than split rings. The gland nut preferably bottoms out against the connector body to provide a visual indicator as to when sufficient torque has been applied. A portion of the compression ring becomes visible upon achieving proper torque, providing a second visual indicator that proper torque has been achieved. A portion of the conduit may be deformed near the gland nut opening to provide a rain tight seal. The continuous compression ring is preferably provided with two substantially flat coaxial end portions on opposite sides of a raised area or stop. The compression ring is designed to provide a positive stop when proper torque is achieved.

The flat surfaces of the compression ring are believed to conform to irregularities that may be present in the surface of the conduit, thereby providing a good seal when compressed by the gland nut. Compression rings that are simply arched or curved and have no such flat sections would not be likely to conform as well to such conduit surface irregularities.

The compression ring 14 is designed so that the raised stop 28 cooperates with the gland nut such that when proper torque is achieved, the gland nut is no longer able to compress the compression ring. The stop further promotes even distribution of ring movement as the gland nut is tightened. The stop 28 prevents additional rotation of the gland nut about the connector body threads when proper torque is achieved. Accordingly, the compression ring can only be compressed a certain amount, i.e., that corresponding to the proper torque. This is preferably achieved at the same time the gland nut bottoms out against the connector body. It will be appreciated, however, that even if the gland nut did not bottom out at this point, the gland nut would still be prevented from further turning by the above-described action of the compression ring 14 and the stop 28 thereof. By employing conductive metal elements in the manufacture of the connector fitting 10, electrical continuity is provided when it is secured to EMT or other metal conduit.

What is claimed is:

1. An electrically conductive connector fitting for a rigid conduit comprising:
   a connector body having a passage for receiving a conduit;
   a gland nut threadably coupled to the connector body, said gland nut including a passage extending therethrough and a shoulder extending into said passage;
   a continuous metal compression ring positioned within said gland nut passage, said compression ring including a stop and an end portion adjacent to said gland nut shoulder, said end portion being positionable within said shoulder when said gland nut is tightened.

2. A connector fitting as described in claim 1 wherein said compression ring is comprised of a central portion including an annular ridge and first and second end portions have substantially flat, rim-like configurations, said stop being comprised of said annular ridge.

3. A connector fitting as described in claim 2 where said compression ring is dimensioned such that, upon tightening of said gland nut, said first end portion of said compression ring is positioned within said gland nut shoulder and said second end portion is urged inside said connector body.

4. A connector fitting as described in claim 3 wherein said compression ring and gland nut are dimensioned such that said first end portion of said compression ring can extend at least partially outside said passage of said gland nut such that it becomes visible to a user upon tightening of said gland nut.

5. A connector fitting as described in claim 4 wherein said connector body includes an exterior shoulder, said shoulder being positioned to engage said gland nut and prevent further tightening thereof once said first end portion of said compression ring has moved at least partially outside said passage of said gland nut such that it is visible to a user.

6. A connector fitting as described in claim 3 wherein said connector body includes an exterior shoulder, said exterior shoulder being positioned to engage said gland nut and prevent further tightening thereof once said first end portion of said compression ring has moved at least partially beyond said gland nut shoulder.

7. A connector fitting as described in claim 1 including at least one means for visually indicating that said gland nut has been properly torqued.

8. A connector fitting as described in claim 1 wherein said end portion of said compression ring extends at least partially beyond said gland nut shoulder and a second end portion thereof extends within said passage of said connector body when said gland nut is tightened on said connector body.

9. A connector fitting as described in claim 1 wherein said stop on said compression ring is engageable with an end of said connector body to limit movement of said compression ring in the direction of said connector body as said gland nut is tightened.

10. A connector fitting as described in claim 9 wherein said stop on said compression ring is engageable with said shoulder on said gland nut.

11. A connector fitting for a rigid conduit comprising:
    a connector body having a threaded exterior surface and a passage for receiving a rigid conduit;
    a gland nut including a passage and threadably coupled to the threaded exterior surface of said connector body;
    a continuous metal compression ring positioned within said gland nut passage, said compression ring including an annular stop and first and second coaxial end portions adjoining said stop; and
    at least one means for visually indicating that said metal gland nut has been properly torqued.

12. A connector fitting as described in claim 11 wherein said indicating means includes one of said end portions of said compression ring that is extendable outside said gland nut passage.

13. A connector fitting as described in claim 11 wherein said indicating means includes an exterior stop on said connector body and an end surface of said gland nut, said end surface abutting said exterior stop when said gland nut has been properly torqued.

14. A connector fitting as described in claim 11 including means for providing a tactile indication that said gland nut has been properly torqued.

15. A connector fitting as described in claim 11 wherein said first and second end portions have substantially flat, rim-like configurations and said annular stop comprises an annular ridge between said end portions, said second end portion being movable into said connector body passage when the gland nut is tightened.

16. A connector fitting for a rigid conduit comprising:
    a connector body having a first passage for receiving a rigid conduit;
    a gland nut threadably coupled to said connector body, said gland nut including a second passage and a shoulder in said second passage;

a continuous metal compression ring positioned within said second passage, said compression ring including an annular stop and first and second coaxial end portions extending from said stop; and means for providing a tactile indication that said gland nut has been properly torqued.

17. A connector fitting as described in claim 16 wherein said means for providing a tactile indication includes said annular stop on said compression ring, an end surface of said connector body, and said shoulder of said gland nut.

18. A connector fitting as described in claim 17 wherein said first and second end portions of said compression ring have substantially flat, rim-like configurations.

19. A connector fitting as described in claim 17 including at least one means for visually indicating that said gland nut has been properly torqued.

20. A connector fitting as described in claim 19 wherein said means for visually indicating includes an end portion of said compression ring configured to be extendable outside said threaded passage of said gland nut.

21. A method of securing an electrically conductive connector fitting to a rigid metal conduit, the connector fitting including a metal connector body, a metal gland nut threadably coupled to the connector body, and a continuous metal compression ring positioned within the gland nut, the compression ring including a central portion including a stop and first and second coaxial end portions adjoining the stop, comprising;

mounting the connector fitting to the rigid metal conduit such that the conduit extends within the connector body and the gland nut; and rotating the gland nut with respect to the connector body, thereby urging said second end portion of said compression ring between said conduit and said connector body and causing said first end portion thereof to be press fit between an inner surface of said gland nut and said conduit such that said fitting is substantially rain tight.

22. A method as described in claim 21 including rotating the gland nut until said first end portion of said compression ring extends far enough between said conduit and said inner surface of said gland nut to become visible.

23. A method as described in claim 21 wherein said connector body includes an external stop, including rotating said gland nut until it engages said external stop.

24. A method as described in claim 21 including rotating said gland nut until engagement of said stop with internal surfaces of said connector fitting is tactilely detected.

* * * * *